No. 774,515. PATENTED NOV. 8, 1904.
P. A. GEIER.
OPTICAL AND MATHEMATICAL INSTRUMENT.
APPLICATION FILED JULY 2, 1904.
NO MODEL.
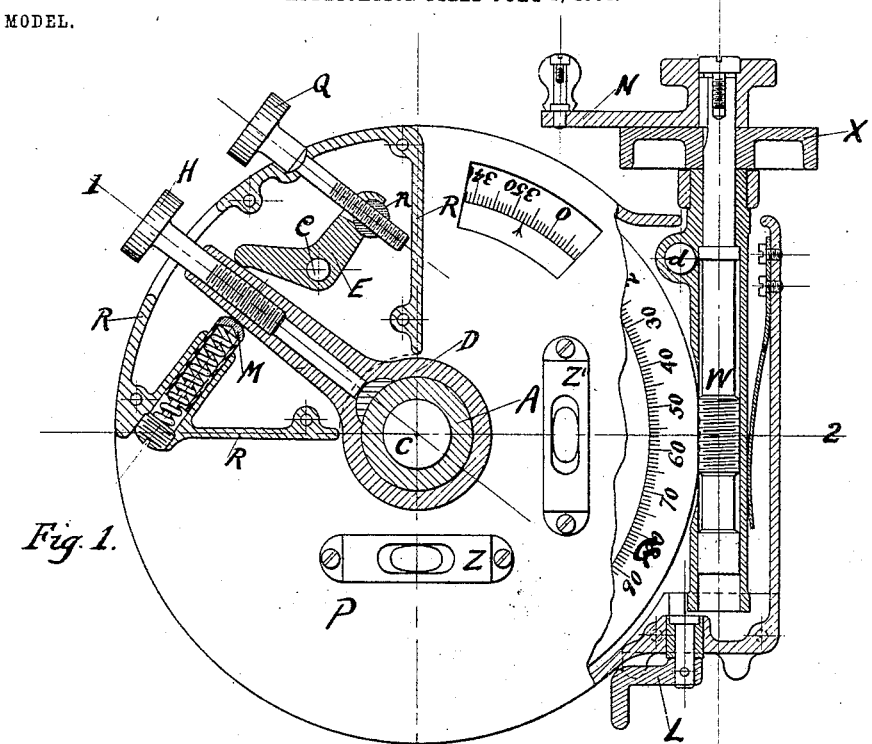
Fig. 1.
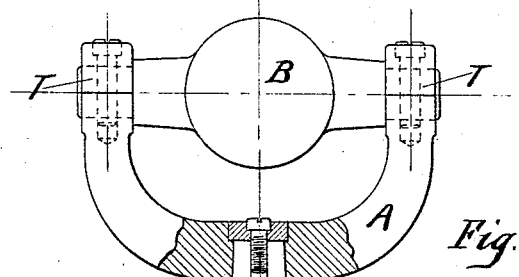
Fig. 2.
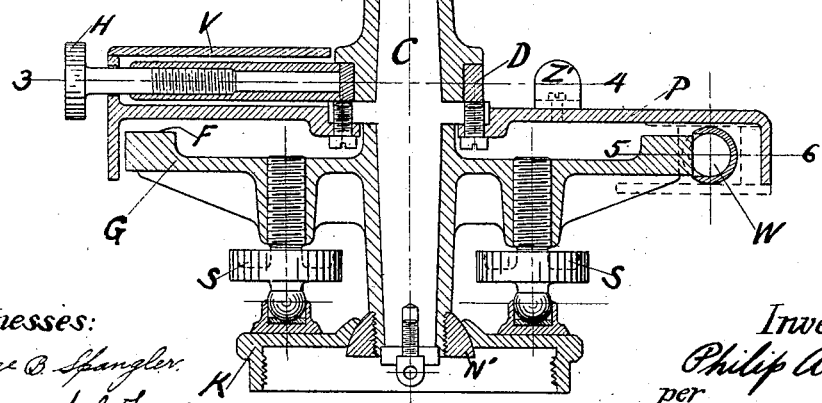
Witnesses:
George B. Spangler.
Howard C. Tresley.
Inventor,
Philip A. Geier,
per
Attorney.

No. 774,515.

Patented November 8, 1904.

UNITED STATES PATENT OFFICE.

PHILIP A. GEIER, OF PHILADELPHIA, PENNSYLVANIA.

OPTICAL AND MATHEMATICAL INSTRUMENT.

SPECIFICATION forming part of Letters Patent No. 774,515, dated November 8, 1904.

Application filed July 2, 1904. Serial No. 215,059. (No model.)

*To all whom it may concern:*

Be it known that I, PHILIP A. GEIER, a citizen of the United States of America, and a resident of Philadelphia, in the county of Philadelphia and State of Pennsylvania, have invented certain new and useful Improvements in Optical and Mathematical Instruments, of which the following is a specification.

My invention relates to improvements in optical and mathematical instruments, consisting particularly of an improved slow-motion adjustment and in a mounting for the rotatable parts of the instrument.

My object has been to avoid certain defects present in prior devices, insuring the provision of a simple and accurate adjustment not liable to damage, and a stable and rigid mounting for the instrument as a whole.

My improvements are particularly applicable to azimuth instruments, transits, theodolites, and, in short, such instruments as are provided with scales insuring the necessity of careful adjustment, the same being herein described as embodied in an instrument of the type first named.

In azimuth instruments it has been hitherto the practice to provide an adjustment for the telescope in the form of a tangent screw acting directly upon some portion of the telescope-mounting. This construction when in proper working order is efficient and satisfactory; but, subjected, as these instruments necessarily are, in use to frequent transportation from place to place and careless handling, the tangent-screw adjustment is a common source of trouble and annoyance, by reason of becoming filled with dirt and by being bent or broken in its exposed position. Again, in instruments of the ordinary type the mounting is not as strong and rigid as it can be made by adopting my improvements, which add materially to the accuracy and utility of the instrument.

My improvements may be described in a preliminary way as consisting in the provision of a completely-incased adjustment comprising an actuating-screw, an intermediate lever part acting upon the adjustable element of the instrument, and an opposing mechanism exemplified in a spring-actuated plunger, all for securing the desired adjustment, and, further, in the inclusion of an integral axial pin, preferably of double conical or slightly-tapered form, whereon the relatively rotatable parts of the instruments are securely mounted.

Details of the instrument shown embodying my improvements will be readily appreciated by making reference to the accompanying drawings, wherein—

Figure 1 is a plan view, partially broken away and in horizontal section, on lines 3 4 and 5 6 of Fig. 2, which shows an azimuth instrument equipped in accordance with my improvements; and Fig. 2 is an angular vertical section through the instrument on diverging lines 1 2 of Fig. 1, likewise partially broken away.

The same character of reference is employed throughout the drawings to indicate similar parts.

The graduated circle G, provided with a scale upon its upper face F, serves as well as a supporting-bed for the instrument and is provided with a peripheral worm thread or teeth about its edge, after the usual manner, for engagement with the worm or screw W. The support-bed is carried upon the base K by means of four leveling-screws S. The steel axial pin C is slightly tapered from either end and is mounted on the base K and in the bed G by means of the semispherical nut N'. A central horizontally-extending flange securely mounts the plate P, by means of interior screws, upon the axis or pin C. The two rectangularly-disposed levels Z Z' are provided on the upper face of plate P, indicating when the instrument has been properly leveled. Pivoted on the plate at *d* is a worm-box mounting the worm W, at the opposite end of which box is a cam-lever L, whereby the worm may be actuated into and out of engagement with the teeth provided in the periphery of part G. This worm W is revolved by means of the crank N and carries the graduated drum X for finer readings than could be obtained from the graduations of the circle G. The said axis C is fitted to freely revolve at the center of the circle G when the worm W is disengaged from the said circle.

The yoke A, which supports the telescope B on trunnions T T, is fitted to revolve freely about the upper part of the axis C except when the clamp D is secured to the yoke A by means of the clamping-screw H.

Securely attached to plate P is the stud e, pivotally mounting the angular or bell-crank lever E in a manner to be readily actuated by the adjusting-screw Q. This is accomplished through the medium of a non-rotatable spherical nut N, seated in a recess provided in the outer end of the lever E, by which arrangement the adjusting-screw is given full control of the lever movement, although having no longitudinal movement itself, and thus always remaining close to the casing. This lever E acts against the clamp D and imparts motion to it, and through it to the telescope B. A spring-plunger M acts constantly against the clamp D to keep it against the lever E and takes up any lost motion in the parts.

The ribs R R R are cast integral with the plate P and in conjunction with the cap V form a case completely inclosing the working parts of the mechanism, protecting them from dirt and mechanical injury.

The base K is for securing the instrument to a tripod or other suitable support.

In using the instrument to measure the horizontal angle between two objects the graduations of the circle G and the drum X are first set to zero. The clamping-screw H is then loosened and the yoke A, with telescope B, revolved about the axis C until the first object comes within the field of the telescope. The screw H is then clamped and the yoke revolved about the axis C by means of the screw Q until the cross-hairs of the telescope accurately bisect the object. The worm is then disengaged and the whole upper part of the instrument revolved upon the worm-wheel G until the second object comes within the field of the telescope. Then the worm W is engaged and revolved by the crank N until the cross-hairs again accurately bisect the object, when the horizontal angle between the two objects can be read from the circle G and the drum X.

Those accustomed to the use of such instruments will at once understand how efficiently the several parts of the telescope adjustment operate and how secure from injury these parts are when constructed after the manner herein disclosed. The arms of the bell-crank lever E are shown substantially of equal length herein; but it is apparent that by varying one or the other of these arms a slower or more rapid adjustment for the telescope is obtainable.

The adjusting-screw is disposed so close to the casing that it is out of the way and not at all likely to be broken or injured.

Other advantages than those herein specifically enumerated will be made manifest to the users of instruments embodying my improvements, and modification of the precise construction herein shown will readily occur to skilled mechanics in adapting my improvements to the various demands of the art.

Having now described and shown an instrument embodying my improvements and clearly set forth the principles of my invention, I claim as new, and desire to secure by Letters Patent, the following:

1. In an adjustment for instruments of the class described, the combination with the part mounted for adjustment, of an intermediate lever part, a nut-like or tapped part mounted therein, and an adjusting-screw operating upon the first-named part through the intermediate lever and its tapped part, substantially as set forth.

2. In an adjustment for instruments of the class described, the combination with the part mounted for adjustment, of an intermediate lever part, an adjusting-screw actuating the same, a spherical nut or tapped part engaged by the screw and carried on the lever and spring-operated means for opposing its motion, substantially as set forth.

3. In an adjustment for azimuth and similar instruments, the combination with a pivoted lever, of the adjusting-screw, having merely rotary movement, an intermediate tapped part movable with the lever and engaged by the screw, and an opposing spring-plunger, substantially as set forth.

4. In an adjustment for azimuth and similar instruments, the combination with a pivoted lever, of a spherical nut provided thereon, an operating-screw closely mounted in the casing and engaging said nut, an opposing spring-plunger, and an inclosing casing adapted to protect the parts from dirt and injury, substantially as set forth.

5. In an azimuth or similar instrument, the combination with the double-ended conical axis or pin provided with a horizontally-extending central flange, a plate secured thereto, a worm mounted thereon, a worm wheel or disk engaged thereby, and a yoke mounting a telescope; said axis or pin being mounted with its lower end in the disk and carrying the yoke and telescope upon its upper portion, substantially as set forth.

6. In an instrument of the class described, the combination with a supporting-bed G, of an axial part C of double conical form mounted therein, a yoke A carried upon the upper portion of said axial part, a plate P intermediately secured to the latter and rotatable therewith, and means for securing the adjustment of the said elements, substantially as set forth.

Signed at Philadelphia, this 30th day of June, 1904, in the presence of two subscribing witnesses.

PHILIP A. GEIER.

Witnesses:
C. H. DUNGAN,
H. C. TRESLEY.